United States Patent [19]

Sussmuth

[11] 4,122,220
[45] Oct. 24, 1978

[54] METHOD FOR REDUCING THE GAS PERMEABILITY OF A SINTERED POROUS SILICON NITRIDE BODY

[75] Inventor: Godehard Sussmuth, Selb, Bayern, Germany

[73] Assignee: Rosenthal Aktiengesellschaft, Germany

[21] Appl. No.: 830,807

[22] Filed: Sep. 6, 1977

[51] Int. Cl.² ............................................ C01B 21/06
[52] U.S. Cl. ..................................... 427/243; 427/226; 427/344; 423/344; 423/471; 106/73.5; 423/413
[58] Field of Search ....................... 423/344, 471, 413; 106/73.5; 427/238, 226, 430, 243

[56] References Cited

FOREIGN PATENT DOCUMENTS 537,716 3/1957 Canada ..................................... 427/238
1,432,559 4/1976 United Kingdom ..................... 423/344

OTHER PUBLICATIONS

Mazdiyasni et al., "J. of American Ceramic Soc.", vol. 56, No. 12, pp. 628–633, 1973.

Primary Examiner—Jack Cooper
Attorney, Agent, or Firm—Ostrolenk, Faber, Gerb & Soffen

[57] ABSTRACT

Silicon nitride bodies are improved by being impregnated with a silicon halide which is then converted to silicon imide in the pores of the body, which, in turn, is converted into silicon nitride.

8 Claims, No Drawings

METHOD FOR REDUCING THE GAS PERMEABILITY OF A SINTERED POROUS SILICON NITRIDE BODY

With further developments in technology and machine construction, both new and more stringent requirements are imposed on already known ceramic constructional materials, the requirements being low weight with high strength, strength at high temperature, resistance to corrosion, resistance to oxidation and impermeability to gas.

In particular, silicon nitride constructional components are nowadays required for use as hot gas conduits in heat exchangers and in turbine installations. As a reduction of the gas permeability of a sintered porous silicon nitride body, however, also leads to improved resistance to oxidation and improved strength, it is not surprising that attempts have already been made to render such bodies thoroughly impermeable to gas by infiltration processes, as appears from German OS 23 60 434 and German OS 23 51 162. In those infiltration processes, unrelated metal salt solutions, acids and esters have been used with a subsequent deposition of oxides or metals within the pores of the saturated body. A disadvantage has been that said infiltration materials have possessed a higher thermal expansion than the sintered silicon nitride. Consequently, the resistance to temperature change has been reduced, and the resistance to high temperature creep has been depressed by reactions of the deposited foreign material with the silicon nitride matrix.

According to the present invention, however, a method of reducing the gas permeability of a sintered porous silicon nitride body includes the steps of saturating said body with a silicon halide, and then precipitating silicon imide in the pores of said body by a treatment with ammonia (gaseous or liquid), the silicon imide thereafter being converted into silicon nitride by firing in a nitrogen atmosphere.

It has been found that by use of this relatively simple method one obtains a thoroughly gas-tight silicon nitride body which consists only of the pure $\alpha$ and $\beta$ phases.

Preferably, the saturation (impregnation) step takes place under pressure (e.g. about 1 to 10 kg/cm$^2$) using silicon tetrachloride or silicon tetrabromide. Moreover, for the precipitation of the silicon imide, ammonia is employed in either gas or liquid form. The infiltration process, including the above-defined saturating and precipitating steps, may be repeated several times in order to achieve a complete filling of the pores. It should also be noted that any ammonium halide which may possibly arise in the precipitation of the silicon imide is preferably removed by a heat treatment.

All the method steps are preferably carried out in a vessel filled with nitrogen, because neither oxygen nor water (including water vapour) should come into contact with the silicon halide. Even a slight quantity of oxygen leads to filling of the pores with silicon oxynitride. Saturation of the silicon nitride pores with silicon tetrachloride is preferably carried out at low temperatures because of the high vapour pressure of this compound. The silicon imide deposited within the pores of the silicon nitride body is finally converted through a silicon nitride phase, which is amorphous to X-rays, into $\alpha$ and $\beta$ silicon nitride, by firing in an atmosphere containing nitrogen, as far as possible up to a temperature of more than 1500° C.

Further advantages and features arising from use of the present invention appear from the following particular example.

Plates of silicon nitride, of reactively sintered silicon powder which had been isostatically pressed, were saturated at a temperature of $-10°$ C. with silicon tetrachloride in a closed vessel filled with nitrogen. The saturated test plates were then flowed over at the same temperature for half an hour by gaseous ammonia. For removal of some ammonium chloride formed along with silicon imide, the test plates were heated in a tubular furnace with flowing nitrogen to 1200° C. In accordance with the data given in the following table, for various batches of the test plates the above-described method steps were repeated several times. The fifth to eighth repeats were carried out under pressure. Thereafter, all the test plates were nitrided in a nitrogen atmosphere at 1550° C.

| TEST PIECE | Bulk tensity (g/cm$^3$) | Porosity (Vol. %) |
|---|---|---|
| Not saturated | 2.514 | 20.9 |
| Saturated 1 time | 2.580 | 18.9 |
| Saturated 2 times | 2.702 | 15.0 |
| Saturated 3 times | 2.791 | 12.2 |
| Saturated 4 times | 2.842 | 10.8 |
| Saturated 5 times | 2.880 | 9.5 |
| Saturated 6 times | 2.914 | 8.4 |
| Saturated 7 times | 2.943 | 7.4 |
| Saturated 8 times | 2.971 | 6.5 |

With the help of X-ray diffraction analysis, a principal content of $\beta$ silicon nitride with a slight content of $\alpha$ silicon nitride was found. Other phases were not present. Thus, as compared with the hitherto known products, the present invention leads to sintered silicon nitride bodies having significantly reduced gas permeability without any different phases. The good resistance of the silicon nitride to temperature change is not damaged as compared with the products produced by other infiltration methods. Moreover, the resistance of the silicon nitride to fatigue at high temperature is not reduced by the method according to the invention, but on the contrary the strength of the pure silicon nitride is raised yet again. The thermal conductivity of the silicon nitride formed by the inventive method is increased, in fact by about 5%.

On the mechanical side, advantages are also produced inasmuch as the ability of the silicon nitride body to be polished is improved, which is particularly important for high temperature bearings. With the help of this method, a desired porosity can be achieved, which lies between 20 and 5 volume % total porosity. One can utilize this for the employment of silicon nitride as filters for aggressive media or as material for diaphragms.

What is claimed is:

1. A method of reducing the gas permeability of a sintered porous silicon nitride body, the method including the steps of impregnating said body with a silicon tetrahalide selected from the group consisting of silicon tetrachloride and silicon tetrabromide, precipitating silicon imide in the pores of said body by contacting the impregnated body with ammonia, and converting the silicon imide into silicon nitride by firing the body in a nitrogen atmosphere.

2. A method according to claim 1, in which the impregnation with a silicon tetrahalide is effected under pressure.

3. A method according to claim 1, in which the impregnating and the precipitating steps are repeated at least once before firing in a nitrogen atmosphere.

4. A method according to claim 1, in which prior to firing, the body is subjected to a temperature below the firing temperature to remove any ammonium halide formed during the precipitation.

5. A method according to claim 1, in which the silicon tetrahalide is maintained out of contact with both oxygen and water.

6. A method according to claim 1, in which the method is effected in a nitrogen atmosphere, the impregnation and precipitation is repeated at least once prior to firing, and in which the firing is effected at a temperature above 1500° C.

7. A method according to claim 6, in which at least one impregnation is effected under pressure, and in which, prior to firing, the body is subjected to a temperature below the firing temperature to remove any ammonium halide formed during the precipitation.

8. A method according to claim 7, in which the silicon tetrahalide is $SiCl_4$.

* * * * *